Aug. 4, 1970     A. U. BRYANT ET AL     3,522,926

EXPANSIBLE SLEEVE VALVE

Filed May 23, 1968     3 Sheets-Sheet 1

INVENTOR.
AUSTIN U. BRYANT
CHARLES C. GERBIC

BY *Gregg & Stidham*

ATTORNEYS

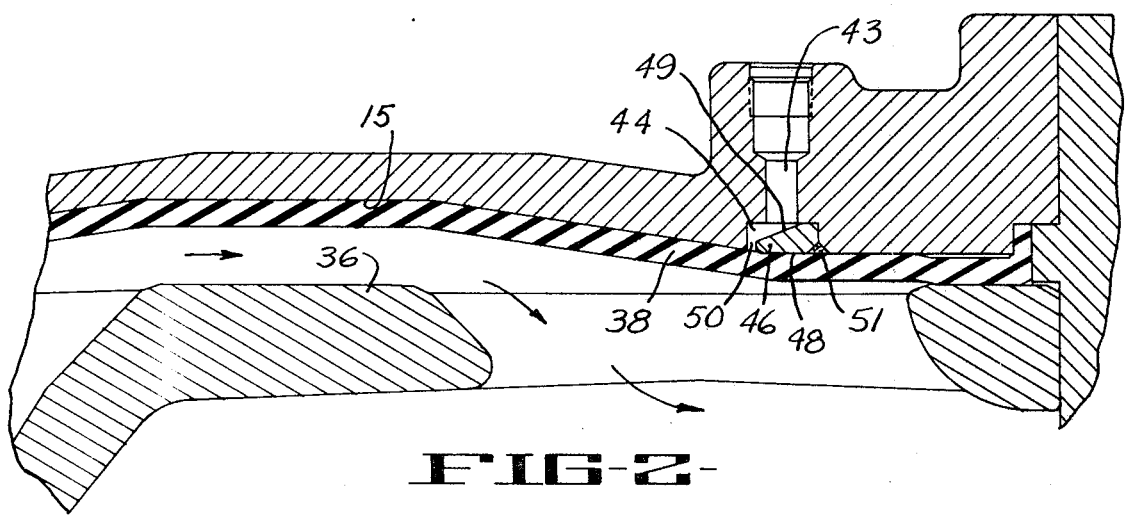
FIG-2-
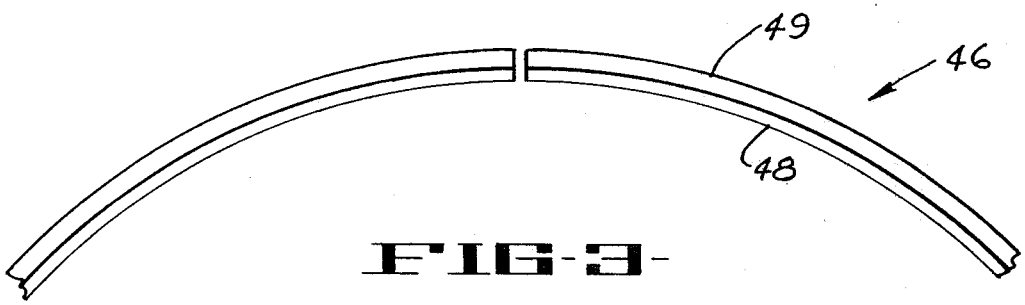
FIG-3-
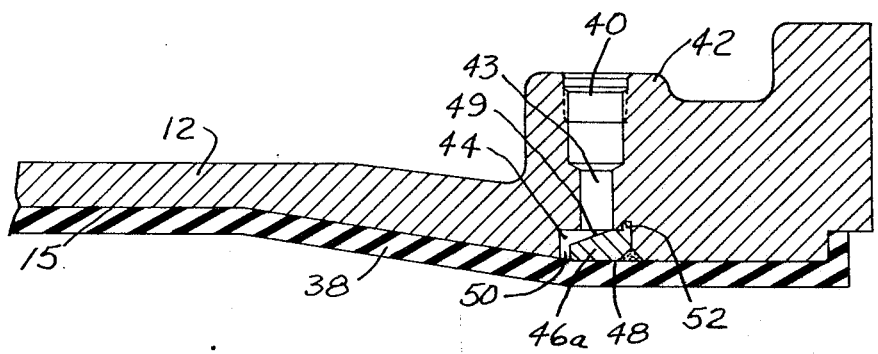
FIG-4-

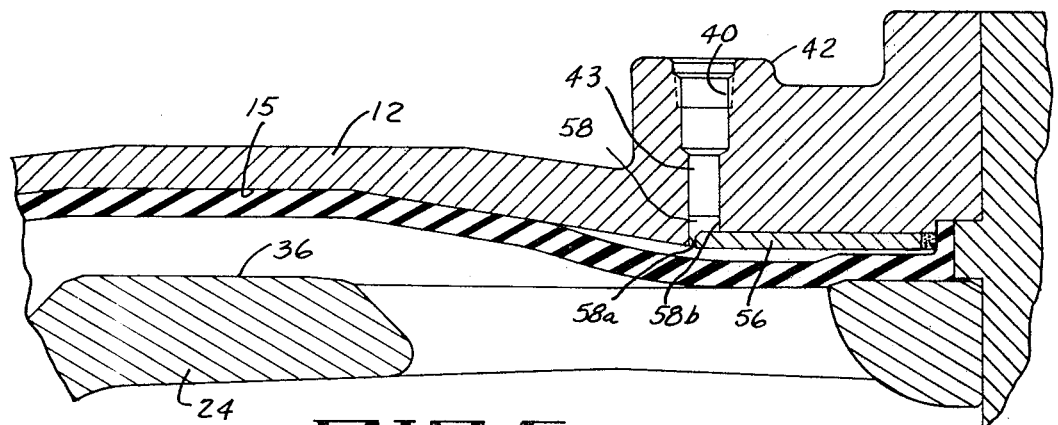
FIG-5-
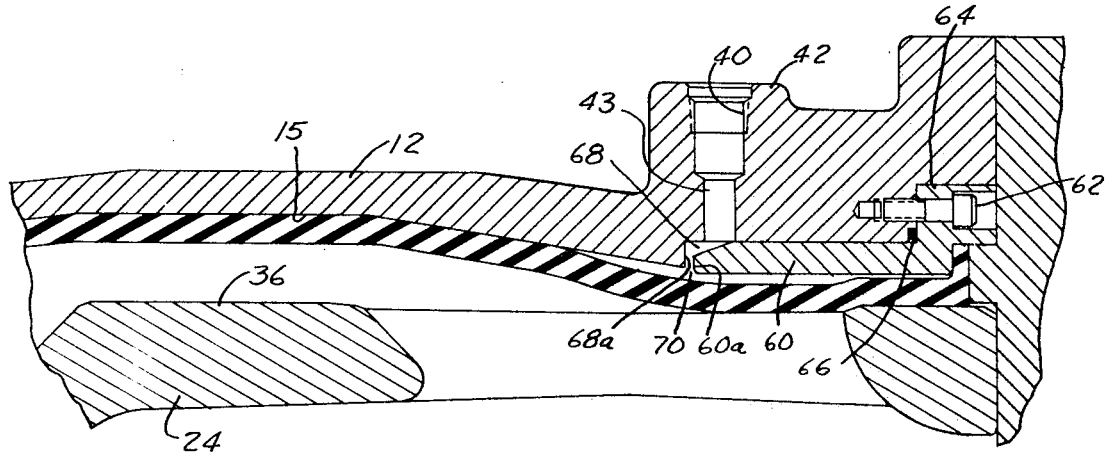
FIG-6-
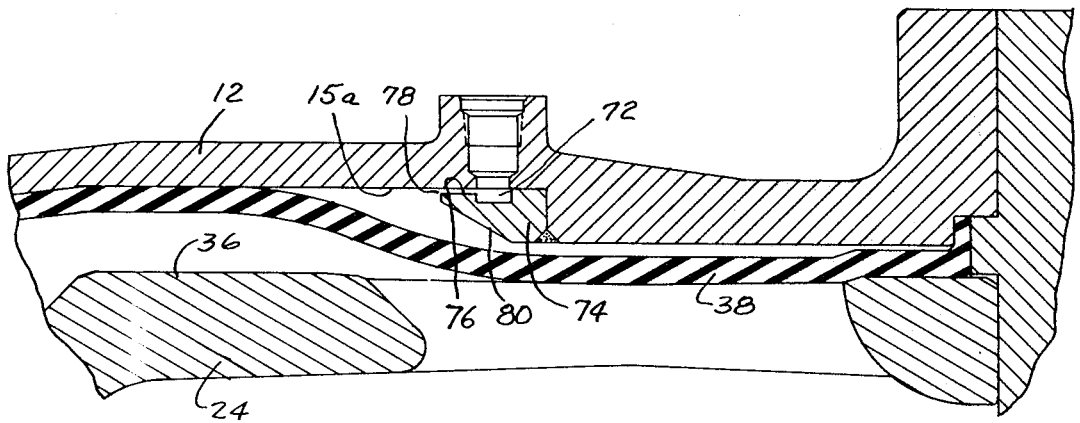
FIG-7-
INVENTOR.
AUSTIN U. BRYANT
CHARLES C. GERBIC
BY
*Gregg & Stidham*
ATTORNEYS

United States Patent Office 3,522,926
Patented Aug. 4, 1970

3,522,926
EXPANSIBLE SLEEVE VALVE
Austin U. Bryant, Walnut Creek, and Charles C. Gerbic, San Anselmo, Calif., assignors to Grove Valve and Regulator Company, Oakland, Calif., a corporation of California
Filed May 23, 1968, Ser. No. 731,405
Int. Cl. F16k 7/07
U.S. Cl. 251—5           9 Claims

ABSTRACT OF THE DISCLOSURE

A valve device comprising a resilient expansible tube that seals around a barrier which extends across the flow passage. There is an expansion-limiting surface forming a chamber in the housing around the tube to accommodate a control fluid which opposes sleeve expansion to determine the level of opening pressure. Formed around the expansion-limiting surface is an annular duct with a narrow, annular port opening into the chamber to insure that the tube is exposed to control pressure uniformly around its circumference. The narrow port all the way around permits rapid operation while avoiding tube damage which may result from impact against a large port opening.

---

This invention relates to an expansible sleeve valve and, more particularly to an expansible sleeve valve of the type disclosed in U.S. Pat. No. 2,353,143, granted July 11, 1944 to Austin U. Bryant, a co-inventor herein.

Generally, the valve disclosed in that patent comprises a housing with inlet and outlet flow passages. The ends of a resilient, expansible tube or sleeve are sealed around the flow passages so that fluid flow through the valve is within the tube. The expansible tube is carried on a cylindrical core sleeve that has two series of lengthwise slots around it with an imperforate barrier across the sleeve between them. The cylindrical outer surface of the barrier is normally snugly engaged by the expansible tube to seal off flow through the core sleeve. However, flow through the valve device occurs when the pressure of the upstream fluid is sufficient to overcome the tension of the expansible tube plus the pressure of the control fluid surrounding it, or conversely, when the pressure of the control fluid is reduced to a level wherein upstream pressure can overcome it to expand the tube away from the sealing surface. When this occurs, the fluid flows out through the upstream slots, around the intermediate barrier and then in through the downstream slots to the outlet flow passage.

In such valve devices, the control fluid is normally introduced from an external source through a conduit opening into the housing. This was satisfactory for most installations, but some problems have arisen where the valve device is required to open or close at a very rapid rate. The opening operation may be impeded by reason of the fact that control fluid in areas of the housing displaced from the conduit through which it must exit, has to be forced toward the conduit by expansion of the tube and then forced out through a relatively low capacity port. Even when rapid expansion is achieved, the tube may be damaged by beating against the surrounding surface. In addition the high velocity flow of the control fluid out through the port creates a low pressure area which tends to suck the tube into the port. Then, when the tube is expanded against the internal surface of the housing, it may block off the conduit port and prevent the control fluid from acting uniformly around the tube. That is, if the control fluid overcomes the line pressure the tube is forced away from the surface just in the area of the port and the control fluid must act progressively around the circumference of the tube before the tube can seal again. Moreover, repeated rapid openings of the on-off type valve tend to damage the tube around the port, even where the port opens into a longitudinal groove to prevent fluid entrapment.

It is, therefore, an object of this invention to provide an expansible tube type valve which is conditioned for rapid operation.

It is a further object of this invention to provide a rapid operating expansible tube valve with means for avoiding tube damage resulting from impact with a large port opening.

It is a further object of this invention to provide an expansible tube type valve which opens and closes by circumferentially uniform expansion and contraction of the tube.

In carrying out this invention we provide in a valve device having a resilient expansible tube that seals around a barrier which extends across the flow passage, an annular port extending completely around the inner wall of the housing for circumferential entry of the control fluid into the chamber around the tube. The inner surface of the housing limits expansion of the tube and an annular duct which is formed around that surface is provided around its inner circumference with a narrow port opening into the chamber. Hence, the control pressure is asserted against and completely around the tube to provide a more uniform opening and closing operation, and the annular gap is narrow enough that danger of tube damage resulting from impact at repeated rapid openings is greatly lessened.

Other objects and advantages of this invention will become apparent from the description following when read in conjunction with the accompanying drawings wherein:

FIG. 2 is an enlarged, partial section view showing one embodiment of recess and collector ring insert comprising a feature of this invention;

FIG. 3 is a partial end view showing the collector ring inserts; and

FIGS. 4, 5, 6 and 7 are partial section views of expansibe tube valves with other collector ring embodiments.

Figure 1:
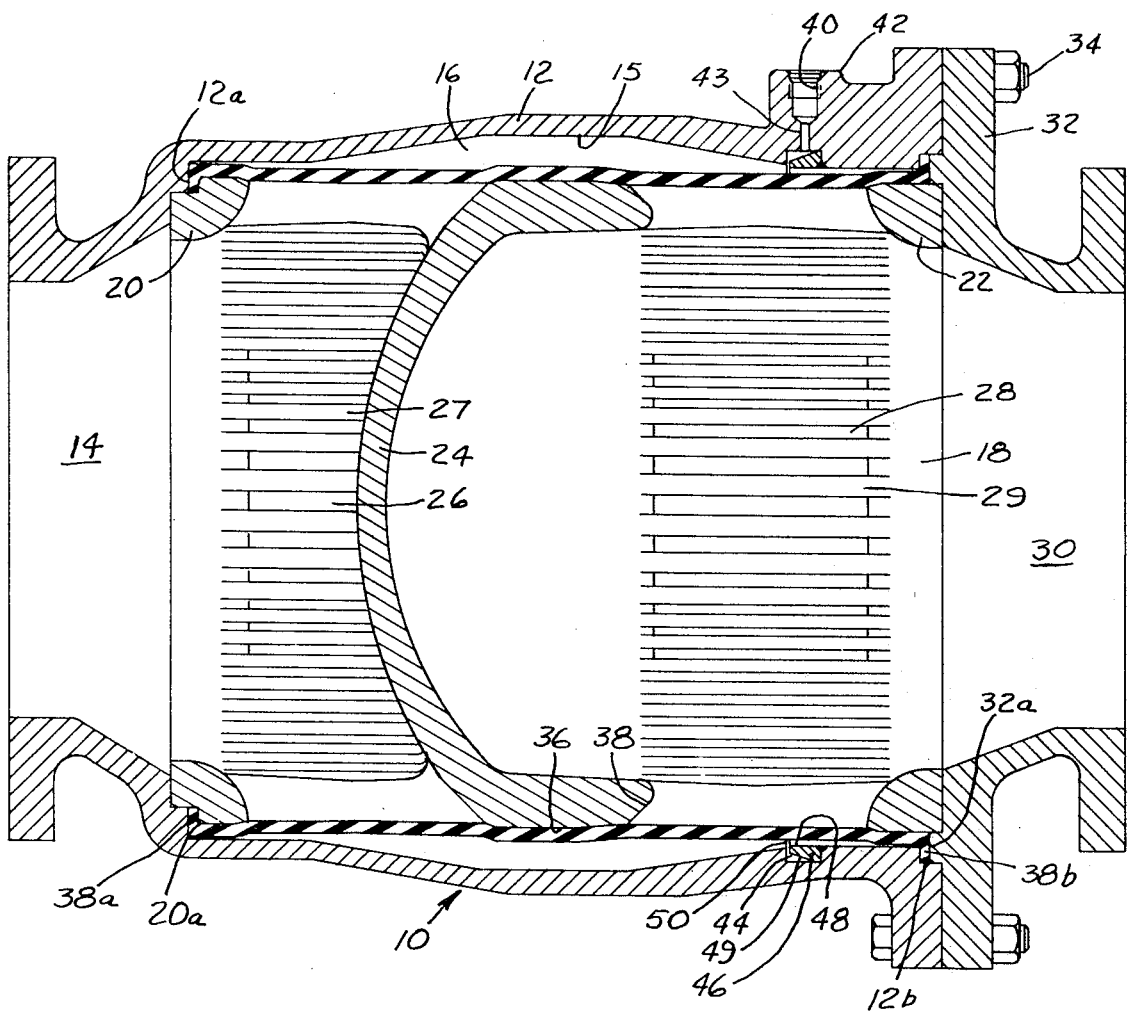
FIG. 1 is a vertical section view of an expansible tube valve embodying features of this invention.

Referring now to the drawings with greater particularity, the expansible tube valve 10 of this invention may include a generally cylindrical main body member 12 which may be cast or otherwise formed with an inlet flow passage 14 with its inner surface 15 recessed intermediate its ends to provide a central, enlarged chamber 16. Concentrically positioned within the main body cylinder 12 is a core cage or sleeve 18 having inlet and outlet mounting rings 20 and 22 and a central barrier or dam 24 which prevents flow of fluid directly through the sleeve. An upstream series of slots 26 formed between ribs 27 provide flow access from the inside of the core 18 and around the barrier 24, and a second series of slots 28 formed between ribs 29 form a means of re-entry into the core at the downstream side of the barrier. Hence, fluid flow through the valve device is from the inlet flow passage 14 into the core sleeve 18, out through the upstream slots 26, around the barrier 24, back in through the downstream slots 28 and out the downstream flow passage 30 which is formed in a closure member 32 secured on the housing 12 as by means of bolts 34.

Carried on the support core, preferably under slight hoop tension in sealing engagement with the outer sealing surface 36 of the barrier 24 is a resilient expansible tube or sleeve 38. The tube 38 has an in-turned flange 38a at the inlet end compressed between a shoulder 20a on the core inlet mounting ring 20 and an internal shoulder 12a on the housing to seal against fluid flow around the core 18, and an out-turned flange 38b at the downstream end sealing between a shoulder 12b in the main body cylinder 12 and an annular rib 32a on the body closure 32.

In assembly, the expansible tube 38 may be placed over the core sleeve 18 with the in-turned upstream flange 38a placed over the shoulder 20a. Then, the core sleeve is inserted into the cylindrical body member 12 through the downstream opening into the position shown in FIG. 1. Finally, the downstream closure 32 is bolted on to the body member 12 with the annular rib pressing against the out-turned flange 38b of the expansible tube 38 to seal off the housing 12 at the downstream end.

A suitable fitting 40 formed in a boss 42 which may be integral with the body member 12 is adapted for connection to a source of pressure fluid (not shown) so that a control pressure may be introduced into the chamber 16 around the flexible tube 38. Thus, the valve device 10 may be operated as a regulator by introducing a control fluid at a fixed pressure which determines the level of pressure desired at the upstream flow passage. If, perhaps as a result of a sudden surge in the line, the upstream flow pressure reaches a level sufficient to overcome the tension in the expansible tube 38 plus the pressure of the control fluid in the chamber 16 resisting expansion of the tube, the tube is expanded outward away from the sealing surface 36 on the intermediate barrier 24 to enable flow of fluid through the upstream slots 26, around the barrier 24 and through the downstream slots 28. Operated in this manner, the expansible tube value is particularly adapted for back pressure regulation to relieve a sudden surge in the line, or for throttling. The valve device 10 may also be operated manually simply by providing a control pressure in the chamber 16 at a level sufficient to prevent the tube from expanding at normally encountered line pressures. Then, when the operator wishes to open the valve to flow, he merely reduces the control pressure in the chamber 16 so that the tube 38 is expanded away from the sealing surface 36.

Expansible tube valves of the type described thus far have proven satisfactory in most services. However, with the inlet port 43 for the control fluid opening into the chamber at an isolated point around the circumference of the tube 38, some difficulty has been experienced, particularly when rapid operation is required. Specifically, the tube cannot expand fully instantaneously around its circumference, but must do so progressively until it can force the control fluid around to the control fluid port 43. Then when the tube is expanded out to the expansion-limiting surface 15 in the housing to block off the port 43, the closing action is delayed until the control pressure commences to overcome the line pressure at the area of the inlet duct and then progressively operates around the circumference of the tube 38.

The difficulty just described is greatly alleviated in the embodiment shown wherein the control fluid inlet duct 43 opens into an annular recess or groove 44 that extends completely around the inner surface 15 of the valve housing 12. Then, welded or otherwise secured within the recess is a collector ring 46 having a generally cylindrical inner surface 48 forming a continuation of the expansion-limiting surface 15 within the valve housing and a conical outer surface 49 which leaves a substantial area in cross section within the recess 44 to form a free-flow duct completely around the expansible tube 38. The collector ring is of an axial length to leave a narrow, annular gap or port 50 adjacent to the opposite edge of the recess which extends completely around the tube. The collector ring 46 is so termed because it "collects" or conversely distributes control fluid completely around the expansible tube even when the tube is expanded firmly against the expansion-limiting surface to the position shown in FIG. 2. Hence, when the control pressure is increased to exceed the line pressure (or the line pressure falls to a level below that of the control pressure) the control pressure is asserted against the expansible tube completely around the periphery to retract the tube in a circumferentially uniform manner progressively from the downstream end of the core sleeve to the intermediate sealing surface. Conversely, when the tube 38 expands, it expands uniformly from the sealing surface 36 towards the downstream end as the control pressure is compressed into the annular duct around the collector ring with no single pocket of resistance localized around the periphery.

As shown in FIG. 3 the collector ring 46 is preferably segmented to facilitate its insertion through the housing opening and into the recess 44 where it is welded into place at 51.

FIG. 4 shows another form of collector ring 46a which is provided with an annular radial lip 52 which fits into a complementary recess in the inner wall of the collector ring recess 44 to insure that the collector ring does not rotate on its cross-section as it is welded in place. That is, in the embodiment shown in FIG. 2 the collector ring may tend to rotate about the upper right hand corner and partially close the annular duct 44 for supply of the control fluid. In addition, the rotation of the collector ring may reduce its minimum inside diameter, requiring machining in order to permit insertion of the core 18 and tube 38.

FIG. 5 shows another embodiment of this invention and may simply comprise a thin sleeve 56 which is inserted into the open end of the housing to extend inward adjacent and opposite the upstream side wall 58a of the annular groove 58. Such a sleeve need not, of course, be segmented. The downstream wall 58b of the recess 58 is made shorter than the upstream groove wall 58b so that the thin sleeve forms a continuation of the expansion limiting surface 15.

Similarly, in FIG. 6 the sleeve 60 may be inserted from the downstream end of the valve body 12 and secured in place, as by means of cap screws 62 or the like, or simply by clamping engagement of the downstream closure 32, which extend through a radial flange 64 carried on the sleeve. In this embodiment, suitable sealing means such as the O-ring 66 is provided to prevent leakage of the control pressure fluid around the sleeve and out between the body and the downstream closure. Here again, the end of the sleeve 60a terminates adjacent the wall 68a of the recess to provide a narrow, annular port 70. As in other embodiments, the annular port is preferably of a width no greater than that of the core slots 26 and 28. In FIG. 7, the annular collector duct 72 is formed in the ring 74 itself with the outer diameter of the ring being reduced slightly at the upstream end 76 to provide an annular port 78 for the control fluid. As in other embodiments, the collector ring is finished on the inner surface to provide a continuation 80 of the expansion-limiting surface 15a. Therefore, in this embodiment the inner surface is tapered outward to conform generally to the desired configuration of the expansion-limiting surface which may be as shown in the embodiments of FIGS. 1 to 6. However, in the particular valve shown the collector ring 80 is positioned farther upstream and is more sharply tapered than in other embodiments. This provides a profile which prevents high frequency vibrations in operation with gas, as shown in U.S. Pat. No. 3,306,569 of co-inventor Austin U. Bryant. In order to facilitate placement, the ring 74 is segmented.

While this invention is described in conjunction with preferred embodiments thereof it is obvious that modifications and changes therein may be made by those skilled in the art without departing from the spirit and scope of the invention defined by the claims appended hereto.

What we claim as our invention is:

1. In an expansible tube fluid flow valve comprising:
   a housing having inlet and outlet fluid flow passages,
   a barrier secured in said housing intermediate and transverse of said flow passages,
   a sealing surface around said barrier,
   a resilient, expansible tube having an intermediate sealing portion normally snugly embracing said sealing surface and end portions sealed around flow passages respectively upstream and downstream of said barrier, a full expansion-limiting surface in said housing displaced radially outward of said sealing portion to form a chamber around said tube, and conduit means for introducing a control pressure fluid into said chamber around said expansible tube, the improvement comprising:

means in said housing forming an annular duct around said expansion-limiting surface, said conduit means opening into said annular duct, and means forming a narrow annular port in and around said annular duct wall opening through said expansion-limiting surface, said annular duct comprising:

means forming an annular recess in and around said expansion-limiting surface embracing said expansible tube, said conduit means opening into said recess, and a ring secured in said recess, the inner surface of said ring forming a portion of said expansion-limiting surface, said ring being so shaped and dimensioned in cross-section relative to said recess as to provide said annular duct communicating with said conduit means and extending around said ring and a narrow access gap between said ring and portions of said expansion-limiting surface adjacent thereto forming said narrow port.

2. The combination defined by claim 1 including:

a conical exterior surface on said ring within said recess to form said flow duct with the bottom of said recess and tapering radially inward to terminate in a gap forming edge closely adjacent a wall of said recess.

3. The combination defined by claim 2 including:

a radial collar on said ring at the large diameter portion of said conical surface, and a complementary groove around said recess receiving said radial collar.

4. The combination defined by claim 1 wherein:

a first portion of the outer surface of said ring in cross-section is seated on the bottom of said recess, a second portion of said outer surface is displaced from the bottom of said recess to form therewith said flow duct, and an annular edge of said ring is closely adjacent a wall of said recess to provide said narrow annular port from said flow duct to said chamber.

5. The combination defined by claim 1 including:

means forming an annular seal between said ring and a wall of said recess.

6. The combination defined by claim 1 including:

large and small diameter portions of said expansion-limiting surface forming a shoulder therebetween, said ring being secured in said housing against said shoulder so that the inner surface thereof is a portion of said expansion-limiting surface, the outer surface of said ring away from said shoulder being displaced slightly from said large diameter portion to form said narrow access gap.

7. The combination defined by claim 6 wherein:

the inner surface of said ring is tapered over at least a portion of its width to form a smooth transition surface between said large and small diameter portions.

8. The combination defined by claim 6 including:

a second outer surface of said ring adjacent said shoulder seating against said large diameter portion, a groove around the outer surface of said ring forming said annular duct.

9. The combination defined by claim 1 wherein:

said recess is formed by a counter bore from the downstream end of said housing forming a shoulder with said expansion-limiting surface, and a sleeve secured in said counter bore with the upstream end thereof closely adjacent said shoulder to form said narrow access gap.

References Cited

UNITED STATES PATENTS

| 1,998,830 | 4/1935 | Beebe | 251—355 X |
| 2,431,593 | 11/1947 | Strike | 251—258 X |
| 3,272,470 | 9/1966 | Bryant | 251—5 |
| 3,306,569 | 2/1967 | Bryant | 251—5 |

FOREIGN PATENTS

| 954,333 | 6/1949 | France. |

ALAN COHAN, Primary Examiner

R. GERARD, Assistant Examiner

U.S. Cl. X.R.

251—61.1